UNITED STATES PATENT OFFICE.

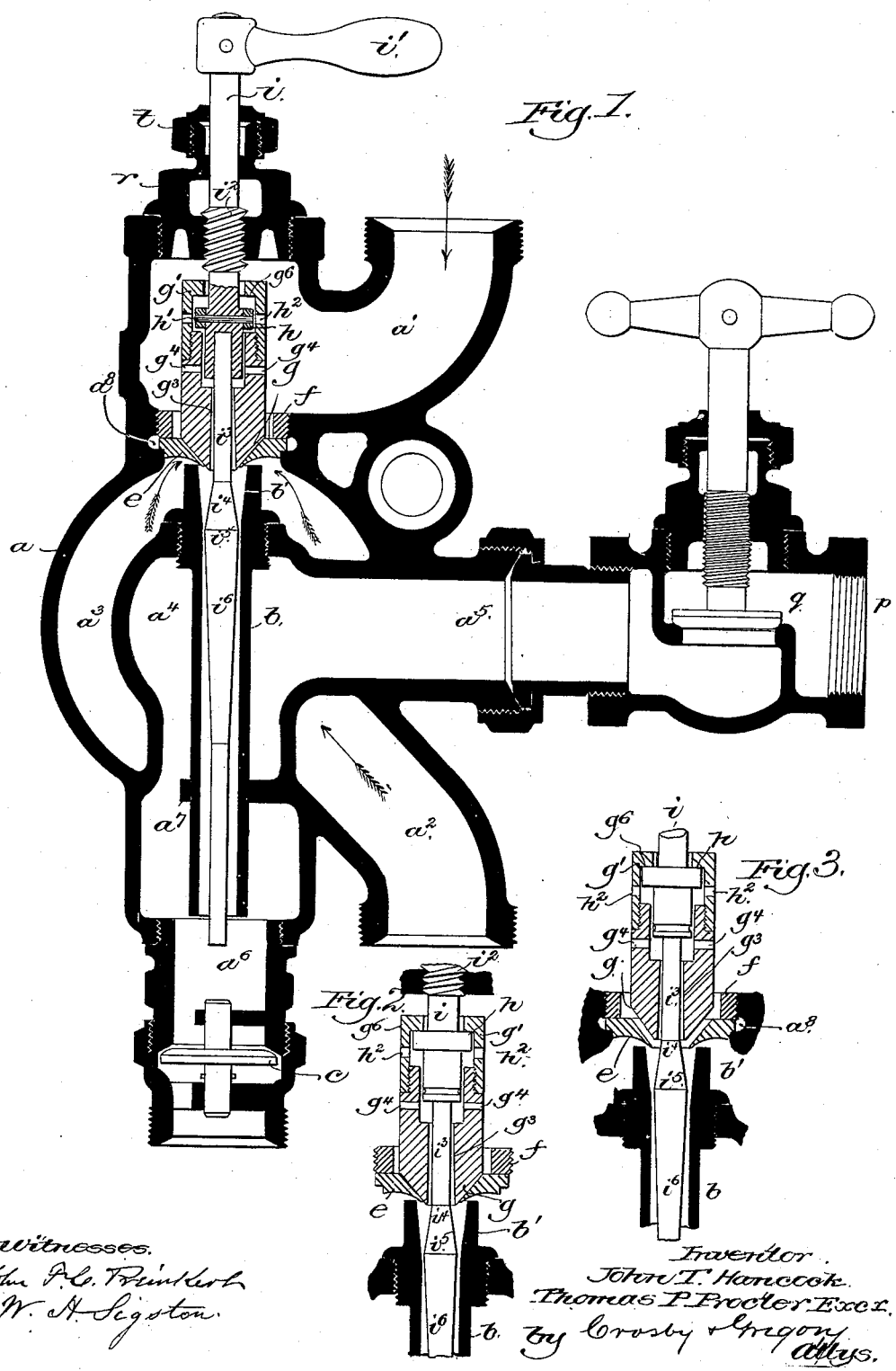

THOMAS P. PROCTOR, OF BOSTON, MASSACHUSETTS, EXECUTOR OF JOHN T. HANCOCK, DECEASED.

INJECTOR.

SPECIFICATION forming part of Letters Patent No. 323,828, dated August 4, 1885.

Application filed January 23, 1885. (Model.)

*To all whom it may concern:*

Be it known that JOHN T. HANCOCK, late of Boston, in the county of Suffolk and State of Massachusetts, a citizen of the United States, deceased, did in his life-time invent an Improvement in Injectors; and I, THOMAS P. PROCTOR, the executor of the last will and testament of the said Hancock, do declare that the following description, in connection with the accompanying drawings, is a specification thereof, like letters on the drawings representing like parts.

This invention, relating to an injector or apparatus for raising and forcing fluids by the action of a jet of steam or vapor, is embodied in an apparatus of that class in which the relative areas of the inlet for the actuating fluid or vapor and the throat of the combining-tube are variable and both controlled by a single controlling-spindle in such manner that in starting the apparatus the actuating-vapor is first admitted in comparatively small quantity and in a jet of low velocity, and the throat of the combining-tube is large relatively to the area of the steam-inlet, making the device effective as an ejector to produce a vacuum in the supply-pipes and raise the column of liquid to the apparatus, after which, in the further operation of the controlling device, the inlet for the actuating-fluid is made larger and the velocity of the incoming jet increased without a corresponding increase in the area of the throat of the combining-tube, so that an effective injecting or forcing apparatus is formed, after which the area of the steam-inlet and throat of the combining-tube may be varied simultaneously without materially changing their relative areas, thus regulating the capacity of the injector. The area of the throat of the combining-tube is regulated by a longitudinally-movable spindle connected with a stem having a handle by which the operation of the apparatus is controlled. The lifting-nozzle is a movable piece, which also constitutes the main valve controlling the flow of steam through the main or forcing nozzle, the said main valve being operated by the said spindle that regulates the area of the throat of the delivery-tube. For convenience, the injector will be spoken of as standing in a vertical position with the inlet at the top and the discharge-passage at the lower end, and steam will be spoken of as the actuating-fluid and water as the liquid to be forced, although it is obvious that the apparatus may operate in other positions and with other fluids.

Figure 1 is a vertical longitudinal section of an injector embodying this invention, the parts being shown in the position assumed when the apparatus is first set in operation, being then especially effective as an ejector or to produce a vacuum and raise a liquid from a lower level; Fig. 2, a detail showing the operative parts in the position assumed when the apparatus is beginning to operate as an injector or effective forcing apparatus, and Fig. 3 a similar detail, showing the parts in the position assumed when the apparatus is operating with maximum capacity as an injector.

The main body of the injector consists of a casting, $a$, having a steam-inlet passage, $a'$, at its upper end and a water-inlet passage, $a^2$, entering a main chamber, $a^3$, at the middle of the casting, which incloses a secondary chamber, $a^4$, having an outlet-opening, $a^5$, which constitutes the overflow of the injector or passage through which the fluids escape before they have acquired sufficient velocity to force their way out of the main delivery-passage $a^6$ at the lower end of the main casting. The upper end of the inner chamber, $a^4$, is provided with a threaded opening, into which is screwed the combining-tube $b$, the lower end of which is held by a spider, $a^7$, in proper position concentric with the axis of the injector. The bore of the combining-tube $b$ is made tapering and converging in the direction of the flow of the fluids through it, as shown at $b'$, for a short distance at its upper end, and for the remainder is cylindrical. The combining-tube opens at its lower end into the delivery-passage $a^6$, which also communicates with the lower end of the chamber $a^4$, so that the fluid passing through the combining-tube may either continue through the passage $a^6$, opening the check-valve $c$, or, if the column of fluid is not under sufficient pressure to open the said check-valve against the back-pressure upon its under side, the fluid will pass back around the spider $a^7$ into the chamber $a^4$, from which it will escape through the passage $a^5$ into the overflow-passage $p$ through the valve $q$, which will be kept open until the column passing through the delivery-tube has acquired the requisite pressure to open the valve $c$. The water-inlet chamber $a^3$ has at its upper end a shoulder, $a^8$, which receives the steam-nozzle $e$, held in place by a threaded collar or nut, $f$, the orifice of the said nozzle $e$ being made in the plane with the inlet opening or mouth of the combining-tube, an annular space being left around the said nozzle through which the liquid from the chamber $a^3$ may enter the combining-tube. The passage through the nozzle $e$ is tapering or inclined, and constitutes a seat for the main steam-valve $g$, controlling the forcing-jet, as will be described, and being formed at the lower end of a cylindrical plug, having at its upper end a cap, $g'$, inclosing a flange or collar, $h$, upon the controlling-spindle $i$, having a handle, $i'$, and screw-thread $i^2$, preferably of steep pitch, working in a cap or bonnet, $r$, screwed into the upper end of the injector and provided with a stuffing-box, $t$, to prevent the escape of steam.

For convenience in construction, the collar $h$ is slipped upon the spindle $i$ after the cap $g'$ has been placed thereon, and is secured upon the spindle by a pin, $h'$, the cap $g'$ being provided with holes $h^2$ to facilitate the driving of the said pin. The plug or valve $g$ has within it the lifting-nozzle $g^3$, shown as somewhat diverging and opening into the mouth of the combining-tube $b$. Steam is admitted to the interior of the plug $g$ to enter the lifting-nozzle $g^3$ through passages $g^4$. When the controlling-spindle $i$ is in its lowest position, the valve $g$ is seated in the forcing-nozzle $e$, thus preventing the flow of steam through it. The controlling-spindle $i$ is continued below the flange $h$, having a cylindrical portion, $i^3$, passing through the lifting-nozzle $g^3$, and below this a diverging portion, $i^4$, which is of greatest diameter at $i^5$, just below the converging portion $b'$ of the passage in the combining-tube, when the spindle is in its lowest position. Below the point $i^5$ of maximum diameter the spindle is converging or tapering in the portion $i^6$, which passes through the cylindrical part of the passage in the combining-tube $b$. For convenience in construction, the portion of the controlling-spindle in and below the lifting-nozzle $g^3$ is made in a separate piece from the threaded portion above the said nozzle, and is attached thereto. When the spindle is in its lowest position and the main steam-valve closed, as described, the portion $i^5$ of maximum diameter of the spindle is in the cylindrical portion of the combining-tube, reducing the area for the passage of fluid to a small annular space or throat, which is, however, larger than the area of the inlet end of the lifting-nozzle $g^3$.

When desired to set the injector in operation, the valve $q$ in the overflow-passage being open, steam will be admitted to the passage $a'$ by the opening of a suitable cock or valve in the pipe leading thereto, and will pass through the passages $g^4$ into the flaring or diverging lifting-nozzle $g^3$, in which the said steam will expand, issuing into the combining-tube with comparatively small velocity, and thus operating to rapidly remove the air from the chamber $a^3$ and water-inlet passage, carrying it out through the chamber $a^4$ and passages $a^5$ and $p$, thus quickly producing a vacuum in the water-inlet passage and causing the water to fill the chamber $a^3$. While the process of lifting is thus going on the operator will turn the handle $i'$, and the operation of the injector as a lifting apparatus will continue as just described until the collar $h$ reaches the shoulder $g^6$ at the upper end of the cap $g'$, as shown in Fig. 2, the time occupied in raising the spindle to this point being about what is required to produce a vacuum and raise the liquid into the chamber $a^3$, and in the further movement of the said spindle the main valve $g$ will be raised, as shown in Fig. 3, permitting the steam to enter through the nozzle $e$ with great velocity, and the said steam, combining with water from the chamber $a^3$, will produce in the combining-tube a column of great pressure, which will force open the check-valve $c$ and enter the boiler or overcome whatever pressure may be on the said valve, the operator in the meantime having closed the overflow-valve $q$.

It will be seen, referring to Fig. 3, that when the main valve $g$ begins to rise from its seat in the nozzle $e$ it will afford a gradually-increasing area for the admission of steam, and at the same time the part $i^5$ of maximum diameter of the spindle will rise through the tapering part $b'$ of the combining-tube, affording a corresponding increase in area at the throat of the combining-tube, so that the capacity of the injector may be varied by moving the spindle slightly upward or downward, the area for the admission of steam and of the throat of the combining-tube both increasing or decreasing together, their relative area, however, remaining substantially constant.

What is claim is—

1. In an injector, the combining-tube and main steam-nozzle, combined with the main valve containing a lifting-nozzle, and the controlling-spindle passing through the main valve and into the combining-tube, substantially as described.

2. In an injector, the combining-tube having a converging inlet-opening, and the main steam-nozzle, combined with the main steam-valve having a lifting-nozzle formed therein, and the controlling-spindle passing through the main valve and into the combining-tube, the said spindle being provided with a collar operating to move the main valve with relation to the main nozzle, substantially as described.

3. In an injector, the combining-tube having a converging inlet-opening, and the main steam-nozzle, combined with the main steam-valve having a lifting-nozzle formed therein, and the controlling-spindle passing through the main valve and into the combining-tube, the said spindle being provided with a collar operating to move the main valve with relation to the main nozzle, and the said spindle also having diverging and converging portions controlling the passage through the combining-tube, substantially as set forth.

4. In an injector, the main casting having inlet and discharge openings at its ends, and a liquid-inlet chamber and secondary or overflow chamber inclosed therein, combined with a steam-nozzle at one end of the water-chamber, and a combining-tube passing from the water-chamber through the secondary chamber, the inlet-opening of the said combining-tube communicating with the inlet-chamber and the discharge-opening of said tube communicating with the secondary or overflow chamber and with the discharge-opening of the injector, substantially as described.

In testimony whereof I have signed my name to this specification in the presence of two subscribing witnesses.

THOS. P. PROCTOR,
*Executor of the said John T. Hancock.*

Witnesses:
ELMER P. HOWE,
EUGENE TAPPAN.